G. RANSON, Jr.
SIGNALING SYSTEM FOR RAILROADS.
APPLICATION FILED MAR. 11, 1910.
1,032,773.
Patented July 16, 1912.
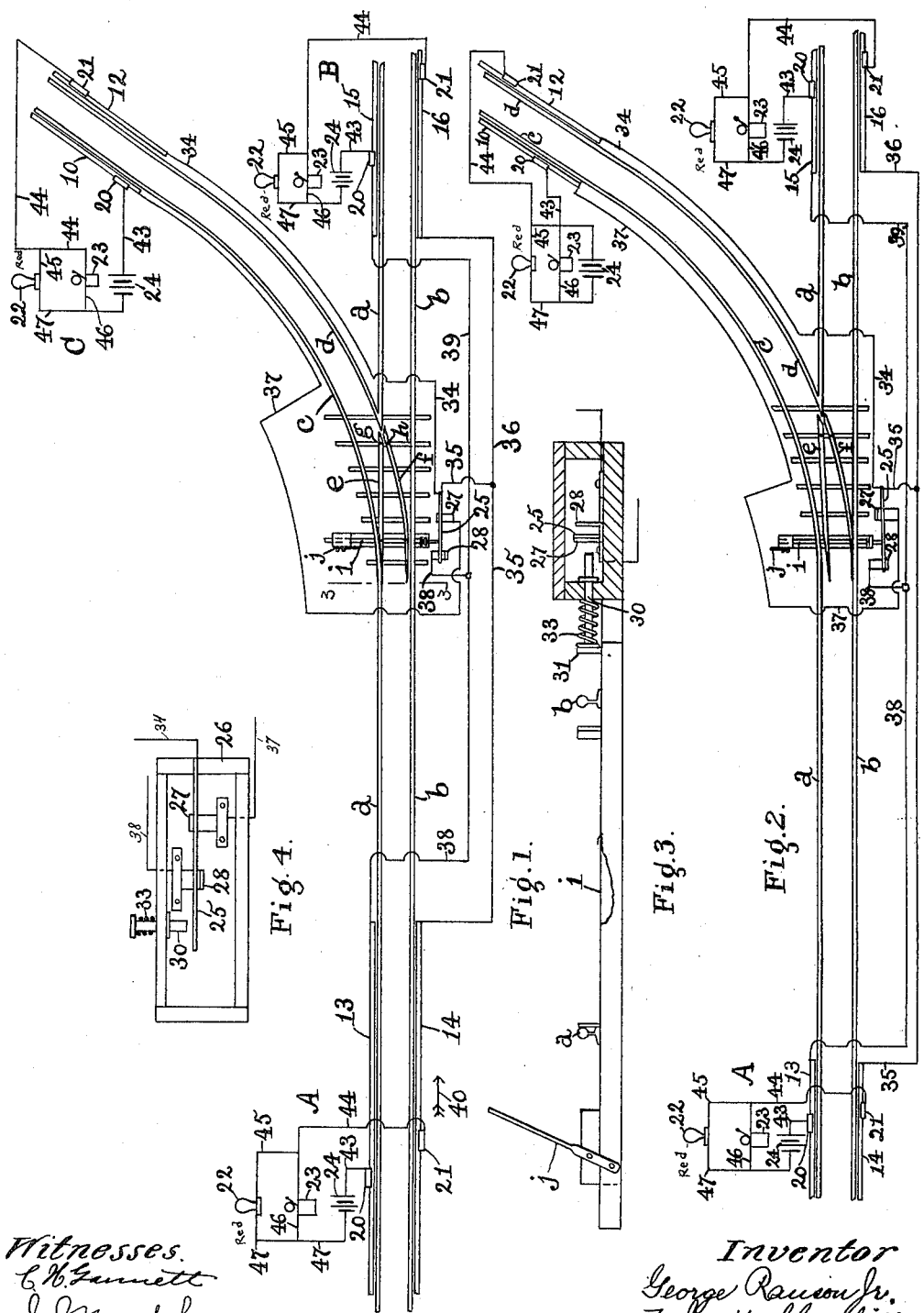
Witnesses.
Inventor
George Ranson Jr.
by Jas. H. Churchill
atty.

UNITED STATES PATENT OFFICE.

GEORGE RANSON, JR., OF JACKSONVILLE, FLORIDA, ASSIGNOR OF ONE-FOURTH TO AUGUSTUS E. SAWYER, OF JACKSONVILLE, FLORIDA.

SIGNALING SYSTEM FOR RAILROADS.

1,032,773.　　　　　Specification of Letters Patent.　　Patented July 16, 1912.

Application filed March 11, 1910. Serial No. 548,616.

*To all whom it may concern:*

Be it known that I, GEORGE RANSON, Jr., a citizen of the United States, residing in Jacksonville, county of Duval, and State of Florida, have invented an Improvement in Signaling Systems for Railroads, of which the following description, in connection with the accompanying drawings, is a specification, like letters on the drawings representing like parts.

This invention relates to a signaling system for railroads and is especially designed and adapted for use on single track railroads comprising a main line and one or more branches therefrom.

The invention has for its object to provide a signaling system with which the engineer is given a warning in case of an open or abnormal condition of the track especially at the track switches, and further has for its object to provide a system, which can be installed and maintained at a minimum expense, which enables single track roads to be provided with means for safeguarding its patrons from head-on and rear-on collisions, and from accidents due to dangerous conditions of the track. To this end, I employ a normally open circuit system, which includes a signal device and source of current located in the cab of the engine, where it is under the supervision of the engineer, contact rails laid alongside the track rails of the main line and branch and located at a suitable distance from the track switch, contact shoes carried by the locomotive and coöperating with said contact rails, and a circuit controller located in the vicinity of the section of the track switch and governing the circuit of the signal mechanism after the circuit of the latter has been established by engagement of the contact shoes with the contact rails as will be described. The circuit controller is in open circuit relation to the signal mechanism in the cab of the locomotive when the contact shoes carried by the latter engage the contact rails alongside of the track, under normal conditions, but under abnormal conditions, as for instance, if a track switch is set wrong, said circuit controller is brought into closed circuit relation with the signaling mechanism in the cab and the latter is operated to give a signal or warning to the engineer of the abnormal condition of the track. The signal mechanism in the cab may be a visual or an audible signal or both, and the circuit controller may be located within a weather-tight box or casing. These and other features of this invention will be pointed out in the claims at the end of this specification.

Figure 1 represents in diagrammatic view a portion of a single track steam railroad, provided with a signaling system embodying this invention. Fig. 2, a view like Fig. 1 with the track switch set to connect the branch track with the main line. Fig. 3, a cross section of the railway track switch and the circuit controller operated by it, the section being taken on the line 3—3, Fig. 1 and Fig. 4, a detail in plan of one form of circuit controller.

Referring to Figs. 1 to 4, $a$, $b$, represent the rails of a single track road and $c$, $d$, the rails of a branch track leading therefrom and adapted to be connected therewith in the usual manner by a track switch of usual construction and comprising the rail sections $e$, $f$, which are pivoted at their rear ends as at $g$, $h$, and are connected at their front ends to a movable support or bar $i$, which extends transversely of the main line track $a$, $b$, and is operated in the usual manner by a lever $j$ connected therewith (see Fig. 3) or in any other suitable or usual manner.

The construction of the switch herein shown is and may be such as now commonly employed in steam railway tracks and constitutes no part of the present invention, which relates to a signal system by which the engineer on an engine, either on the main track $a$, $b$, or on the branch track $c$, $d$, is notified as to the condition of the road and, as represented in Fig. 1, of the track switch.

The signal system includes a set of contact rails 10, 12, laid alongside of the rails $c$, $d$, of the branch track, and two sets of contact rails 13, 14, 15, 16, laid alongside of the rails $a$, $b$, of the main line track on opposite sides of the track switch $e$, $f$.

The contact rails referred to, are located away from the track switch such a predetermined distance, say one-half a mile, as will enable the engineer to bring his train to a stop after receiving the warning signal. The contact rails have coöperating with them contact shoes 20, 21, of any suitable or desired construction, which are carried by the locomotive and are designed to engage the upper surfaces of the contact rails, when the locomotive arrives at the place where the contact rails are located.

The contact shoes 20, 21 are connected in circuit with preferably both a visual and an audible signal within the locomotive cab. The visual signal is represented as an incandescent electric lamp 22, which may be provided with a red globe, and the audible signal may be a bell 23, which is arranged in multiple with the lamp as herein shown and connected with a storage or other battery 24 also carried by the locomotive.

The operation of the signal mechanism within the locomotive cab is governed by a circuit controller, which as shown in Fig. 1 is operatively connected with the movable track switch, and in the present instance I have illustrated one form of circuit controller and one way in which it is operatively connected with the track switch, but it is to be understood that I do not desire to limit the invention to the particular construction or arrangement shown.

The circuit controller referred to is shown separately in Fig. 4 and is provided with a movable member 25 represented as a piece of spring metal fastened at one end to one wall of an inclosing casing or box 26 within which said circuit controller is located. The movable member 25 coöperates with two stationary members 27, 28 located on opposite sides of said movable member and with one of which as 27 the movable member 25 makes contact, as for instance when the track switch is closed to the branch and is arranged to complete the main line track, which condition is represented in Fig. 1.

The movable member 25 is designed to be disengaged from the member 27 and engaged with the member 28 when the track switch is thrown or moved so as to connect the branch track with the main line (see Fig. 2), and this result may be accomplished as herein shown by means of a plunger or rod 30 extended through a side wall of the box 26 and adapted to be engaged by a projection 31 on the sliding support $i$ for the switch rail sections $e$, $f$. When the track switch is thrown from the position shown in Fig. 2 to that shown in Fig. 1, the plunger 30 may be moved outward by the spring action of the movable member 25 or by a separate spring 33.

The members of the circuit controller operated by the movable portion of the track are electrically connected with the contact rails by conductors or wires, which in practice may be run through a metal or other protective pipe, not shown, and properly insulated therefrom in a manner well understood. The movable member 25 of the circuit controller is connected by the wire 34 with the contact rail 12 and by wires 35, 36, to the contact rails 14, 16. The contact rail 10 is connected by the wire 37 to the stationary terminal or member 27 of the circuit controller, and the contact rails 13, 15 are connected by wires 38, 39 with the stationary terminal or member 28.

I have herein shown three signal mechanisms connected with the three sets of contact rails, and let it be supposed that they represent three locomotives A, B, C, for the purpose of enabling the operation of the signal system to be readily understood.

Referring to Fig. 1, let it be supposed that the locomotive A is running on the main line in the direction indicated by the arrow 40. When the locomotive A approaches to within one half mile or other distance determined upon, from the branch track $c$, $d$, the contact shoes 20, 21, carried by it engage the contact rails 13, 14, and if the track switch is in its proper position to close the branch track as represented in Fig. 1, a signal will not be given, thereby indicating to the engineer that the track switch is in its proper position. In this case, the circuit of the signal in the locomotive cab while closed between the contact shoes 20, 21, and the contact rails 13, 14, will be open between the members 25, 28, of the circuit controller governed by the track switch. If, however, the track switch should be open so as to connect the branch track with the main line, which condition is represented in Fig. 2 the circuit of the signal mechanism on the locomotive A will be closed between the members 25, 28, and the signal given. In the present case, the red lamp 22 would be illuminated and the bell 23 rung. This circuit may be traced as follows:—from battery 24 on locomotive A by wire 43 to contact shoe 20, thence by contact rail 13, wire 38 to stationary member 28 of circuit controller, thence by movable member 25 and wire 35 to contact rail 14, thence by shoe 21, wires 44, 45, to bell 23 and lamp 22, thence by wires 46, 47 back to battery 24. If the locomotive B is running on the main line in the direction opposite to that indicated by the arrow 40, no signal will be given to the engineer of locomotive B, if the track switch is closed as shown in Fig. 1, because the circuit of the signal mechanism in the cab of locomotive B while closed between the shoes 20, 21 and contact rails 15, 16, is open between the members 25, 28 of the circuit controller operated by the track switch. If on the other hand, the track switch should be open as shown in Fig. 2, the circuit of the signal mechanism will be closed and the signal given as soon as the contact shoes 20, 21 of locomotive B engage the contact rails 15, 16. This circuit may be traced as follows:— from the battery 24, on locomotive B, by wire 43 and shoe 20 to contact rail 15, thence by wires 39 38 to the stationary member 28 of circuit controller, thence by movable member 25 and wires 35, 36, to contact rail 16, thence by shoe 21, and wires 44, 45 to bell 23 and lamp 22, and thence by wires 46, 47, back to the battery 24.

If the locomotive C on the branch track is approaching the main track and the track switch is closed as represented in Fig. 1, the engineer will receive warning by the illumination of the lamp 22 and the ringing of the bell 23 in the cab of his engine C, because the circuit of his signal is closed between the members 25, 27, of the circuit controller governed by the track switch. This circuit may be traced as follows:— from battery 24 of locomotive C by wire 43 and shoe 20 to contact rail 10, thence by wire 37 to stationary member 27 of circuit controller, thence by movable member 25 and wire 34 to contact rail 12, thence back to the battery 24 by shoe 21, wires 44, 45, lamp 22, bell 23 and wires 46, 47. If the track switch is open to the main line as represented in Fig. 2, no signal will be given, for the circuit of the signal mechanism in this case is open between the members 25, 27 of the circuit controller operated by the track switch. It will thus be seen that when the track switch is closed to the branch track, the locomotives on the main line can approach the track switch in either direction and proceed with assurance of a safe condition of the track, as the signal mechanisms carried by them are not operated, whereas the signal mechanism carried by the locomotive C on the branch track will be operated and the engineer thereof notified of a dangerous condition of the track, namely, that the track switch is closed against him, which notification will be received in ample season for him to stop his train and investigate the situation or change the switch, and when this is done, the signal mechanism of the locomotives A, B, on the main line will be operated as soon as the contact shoes on said locomotives engage their coöperating contact rails, thereby notifying them that the switch is open to the branch track.

In Fig. 1, it will be observed that the circuit controller operated by the track section comprises practically two circuit controllers with a common movable member, and while this construction may be preferred, it is not desired to limit the invention in this respect.

Claims:

1. The combination with a railway track comprising a main line and a branch therefrom and with a track switch coöperating with said main line and branch, of sets of contact rails arranged alongside of the rails of the main line on opposite sides of the track switch and alongside of the rails of the branch track, said contact rails being located at predetermined distances from said track switch, a circuit controller located in the vicinity of the track switch and provided with a movable member electrically connected with one of the contact rails of each set of contact rails, a stationary member electrically connected with the other contact rail of the set on the branch track and engaged by said movable member when the track switch is closed, a second stationary member electrically connected with the other contact rails of the main line sets and disengaged by said movable member when the track switch is closed, means for operatively connecting said movable member with said track swith, and a signal mechanism carried by a vehicle movable on the track and provided with contact devices to engage the contact rails, substantially as described.

2. The combination with a railway track comprising a main line and a branch therefrom and with a track switch coöperating with said main line and branch, of contact rails arranged alongside of the rails of the main line on opposite sides of the track switch and alongside of the rails of the branch track, said contact rails being located at predetermined distances from said track switch, a circuit controller electrically connected with the contact rails of the branch track and closed when the track switch is closed, and a circuit controller electrically connected with the contact rails of the main line and open when the track switch is closed, means for operatively connecting the track switch with said circuit controllers, a signal mechanism carried by a vehicle movable on the track, and contact devices carried by the said vehicle coöperating with said contact rails and electrically connected with said signal mechanism, substantially as described.

In testimony whereof, I have signed my name to this specification in the presence of two subscribing witnesses.

GEORGE RANSON, Jr.

Witnesses:
AUGUSTUS E. SAWYER,
EDWARD G. SVENSON.